United States Patent
Stevenson et al.

(10) Patent No.: US 6,905,295 B2
(45) Date of Patent: Jun. 14, 2005

(54) BLIND RIVET WITH EXTENDED ADHESIVE RESERVOIR

(75) Inventors: Robin Stevenson, Bloomfield, MI (US); Pei-Chung Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/624,275

(22) Filed: Jul. 22, 2003

(65) Prior Publication Data

US 2005/0019131 A1 Jan. 27, 2005

(51) Int. Cl.[7] .............................................. F16B 13/04
(52) U.S. Cl. ........................... 411/34; 411/38; 411/82; 411/930
(58) Field of Search ..................... 411/34, 38, 15, 411/43, 45, 82, 82.3, 930

(56) References Cited

U.S. PATENT DOCUMENTS

| | | | | |
|---|---|---|---|---|
| RE20,055 E | * | 8/1936 | Huck | |
| 2,092,341 A | * | 9/1937 | De Vries | 52/704 |
| 2,324,142 A | * | 7/1943 | Eklund | 411/38 |
| 3,772,957 A | | 11/1973 | Newton | |
| 3,820,297 A | * | 6/1974 | Hurd | 403/2 |
| 4,826,372 A | * | 5/1989 | Kendall | 411/43 |
| 4,830,558 A | * | 5/1989 | Sweeney | 411/258 |
| 4,958,971 A | * | 9/1990 | Lacey et al. | 411/38 |
| 5,645,383 A | * | 7/1997 | Williams | 411/43 |

FOREIGN PATENT DOCUMENTS

EP 168355 * 1/1986

* cited by examiner

*Primary Examiner*—Flemming Saether
(74) *Attorney, Agent, or Firm*—Kathryn A. Marra

(57) ABSTRACT

This invention provides a design of an adhesive encapsulated blind rivet for joining an assembly of overlying parts having an accessible side and an inaccessible side. The rivet comprises a rivet head and tubular rivet body. A mandrel is inserted through the open end of the tubular rivet body and through a mandrel hole in the rivet head. A mandrel head engages the end of the tubular body. The tubular body is filled with a mass of latent adhesive around the mandrel. The rivet body is longer than the thickness of the parts to be joined to accommodate a substantial amount of adhesive for expulsion through holes in the rivet body located within the thickness of the assembled parts. The portion of the rivet body extending beyond the blind side of the assembled parts is weakened in a pattern of corrugations or other bands for folding of the end of the tubular body in setting the blind side of the rivet and expelling the larger quantity of adhesive against and between the riveted parts.

13 Claims, 1 Drawing Sheet

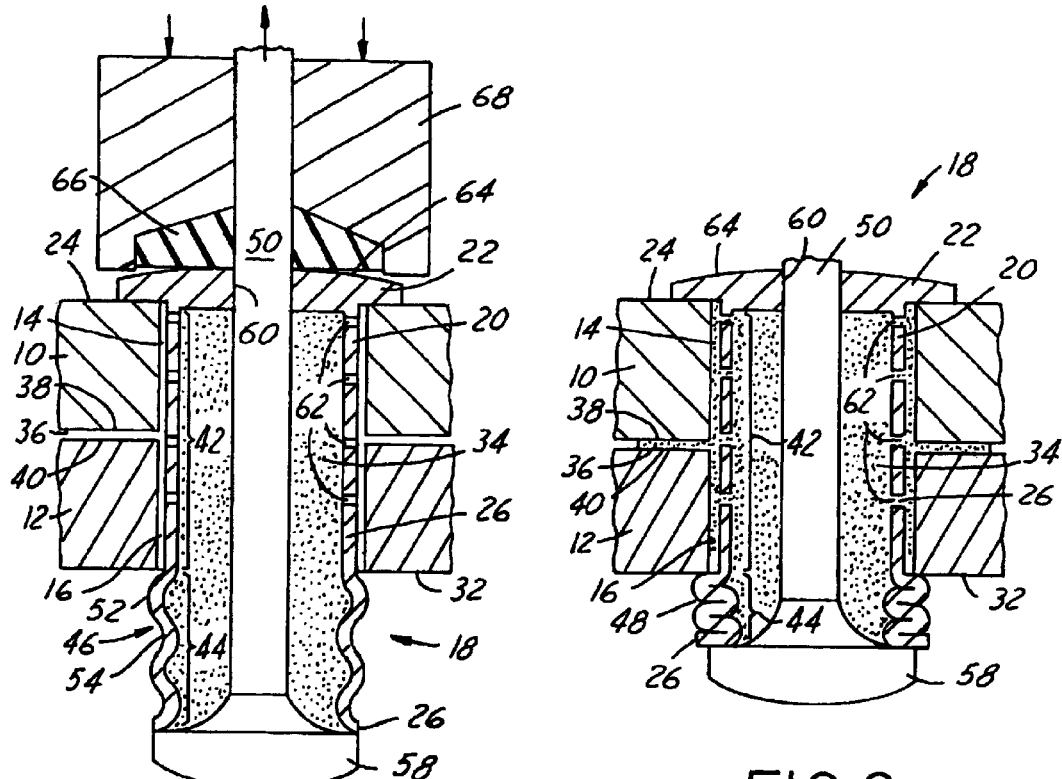
FIG.1
FIG.2
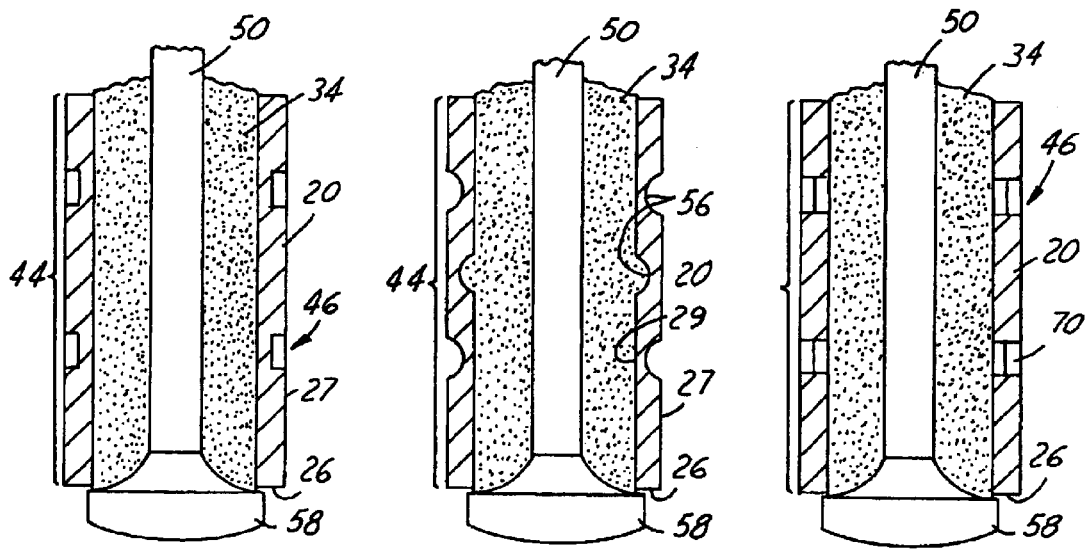
FIG.3A
FIG.3B
FIG.3C

BLIND RIVET WITH EXTENDED ADHESIVE RESERVOIR

TECHNICAL FIELD

This invention relates generally to blind rivets. More specifically, this invention relates to a rivet having an extended adhesive reservoir and to a method of using the adhesive filled rivet to join a plurality of parts.

BACKGROUND OF THE INVENTION

The common rivet has a head and a shank. The shank is inserted through aligned holes from one side of assembled metal sheets or plates or other parts. The rivet head engages one side of the assembly and the shank extends through the other side. The extended end of the shank is struck and upset or otherwise deformed to form a second head engaging the other side of the assembly and thus secure the parts at the rivet site. In a blind rivet situation only one side of the assembly is available for the riveting operation. The shank can be inserted through the assembly so that the rivet head engages the accessible side, but the blind side is not accessible for upsetting the protruding shank from that side to form the opposing rivet head.

Blind rivets often have a hollow shank like a tube or sleeve with the rivet head at one end. A mandrel with a mandrel head is inserted through the open end of the tube. The head of the mandrel is about the same diameter as the tubular body and the bottom of the mandrel head lies against the open end of the tube. The shaft extends axially the length of the tube and through a suitable hole in the rivet head. The rivet body and mandrel head are inserted through the holes in the assembled parts so that the rivet head engages the accessible side of the assembly. The blind end of the tubular body and the mandrel head extend through the assembly with just enough material protruding from the blind side for formation of a rivet head on that side. A tool is used to pull on the end of the mandrel extending through the rivet head. The mandrel is pulled so that the mandrel head compresses and deforms or upsets the end of the rivet body to form a second rivet head against the blind side of the assembly.

Sometimes blind rivets include a latent adhesive deposited within the region bounded by the rivet body and the mandrel shank. One or more radial holes of suitable size and location are formed in the tubular body. When the end of the tube is upset, a small amount of adhesive is extruded through the holes in the sleeve into contact with the surfaces of the insertion holes of the parts to be joined. The adhesive may also penetrate between the faying surfaces of the parts. The adhesive dries or cures to supplement the mechanical holding strength of the blind rivet. The design of such blind rivets has required a compromise in the length and properties of the sleeve so that the blind-side rivet could be easily formed using the mandrel head upsetting tool. The short stroke of the head forming operation limited the amount of rivet head that could be formed and the amount of adhesive that could be effectively extruded into the rivet region.

It is an object of the present invention to provide an adhesive filled blind rivet that comprises a tubular rivet body that is capable of storing and delivering larger volumes of adhesive while being folded into a blind side rivet head. It is a further object of the present invention to provide a method of installing the adhesive filled blind rivet to form a stronger bond between the assembled parts such that these parts are suitable for a structural assembly.

SUMMARY OF THE INVENTION

This invention provides a blind rivet for use in joining two or more sheets or plates or layers of material. Typically the parts to be joined are metal or plastic or composite material. Rivet holes are formed in the parts and they are assembled with the holes aligned for insertion of the rivet. In the practice of this invention the parts are shaped so that the rivet can be inserted from one side but the other side of the rivet site is inaccessible for the setting of the rivet by simply striking the end of the bolt or shank to form the second rivet head. An example of such an assembly is where a sheet is to be riveted to a tube and the rivet must be set by upsetting the end of the rivet shank that is inside the tube.

The rivet of this invention comprises a rivet head attached to one end of a tubular rivet body. The other end of the tubular body, which will extend past the blind or inaccessible surface of the assembled parts, will be compressed or upset to form the rivet head at the blind end of the rivet. Usually the tubular rivet body is round to loosely fit into the rivet holes of the assembled parts. The length of the hollow rivet body is important for reasons that will be explained.

A mandrel shaft and mandrel head are used to upset the end of the tubular rivet body. The mandrel shaft is inserted through the open end of the tubular body and along its axis so that the mandrel head rests against the end of the tubular body and the mandrel extends through a complementary hole in the rivet head. After the rivet body and mandrel head have been inserted through the rivet site holes in the accessible side of the assembly, a suitable riveting tool is used to pull on the end of the mandrel extending through the rivet head to upset the end of the tubular body against the inaccessible side of the parts. The setting of the rivet by forming the blind side rivet head mechanically attaches the parts at the rivet site. In accordance with this invention, the hollow rivet body is also filled with a viscous latent adhesive for supplementing the mechanical bond with an adhesive bond. In order to better form both the mechanical and adhesive bonds in the blind riveting operation special attention is given to the design of the tubular body.

The hollow tubular body is constructed to have a first portion with a first length and a second portion with a second length. The first portion has a length to extend from the rivet head just through the thickness of the parts to be joined. The inside of the first portion contains the mandrel, if a mandrel and mandrel head are used to set the rivet in the blind riveting operation, and a mass of latent adhesive. Radially directed holes are formed along the length and around the circumference of the first portion for expulsion of the flowable adhesive out of the first portion of the rivet body against the rivet hole surfaces in the parts and between the faying surfaces of the parts being joined.

The rivet body has a second portion with a second length that extends from the end of the first portion to the end of the tubular rivet body. The mandrel head engages the end of the rivet body with the mandrel extending through the second portion and through the first portion and the rivet head. But the length of the second rivet body portion is determined so that a volume of adhesive may be carried in it that can be used to increase the delivery of adhesive to the riveted parts during the upsetting of the tubular rivet body in the riveting operation. The second portion of the rivet body is sized to hold an amount of adhesive that is at least 50% and preferably 100% or more of the adhesive that is contained in the first portion of the tubular body. Thus the total amount of adhesive contained in the rivet body is substantially increased. During the stroke of the mandrel head in upsetting the second portion of the tubular body more adhesive is pushed along the length of the collapsing structure and expelled through the holes in the first portion of the tubular body against and between the parts that are being riveted.

In order to obtain a controlled collapse of the second portion of tubular body, weakened regions are formed in that portion of the body to better obtain uniform or symmetrical folding of the tube material in shaping the blind side rivet head. Corrugations or other forms of weakened bands are formed along the length of the second portion so that the metal folds neatly to constitute the second rivet head under the axial force of the mandrel head on the end of the tubular body. Corrugations or other suitably located thinned or softened circumferential bands in the metal better enable alternate radially inward and outward folds of the end of the tubular body against the blind side of the riveted parts. And the longer stroke of the mandrel head and the folding of the metal pushes much more adhesive from the first portion of the tubular rivet body against and between the nearby surfaces of the parts. This strengthens the bond between the riveted parts.

Since considerable tension (and jerking) is exerted on the free end of the mandrel in setting the blind end of the tubular rivet body, it is preferred that the hole for the mandrel shaft in the rivet head be sealed against escape of the adhesive. This may be accomplished by applying a pressure plate with a sealing ring around the end of the mandrel and over the rivet head. In pulling the mandrel to set the rivet, the rivet setting tool bears against the pressure plate and seal to close the hole in the rivet head against escape of adhesive through that path.

Suitable adhesives for this application are commercially available. They are suitably inert and pliable for filling into the rivet body/mandrel assembly and for storage there until the rivet is used and set. The adhesive is cured or hardened when extruded at the rivet site. Some adhesives cure upon heating. Others cure upon exposure to moisture or air after being extruded during the setting of the rivet. Other adhesives contain a curing agent in micro-encapsulated form and the shearing of the adhesive during expulsion from the rivet body breaks the capsules and initiates curing.

These and other objects and advantages of this invention will become apparent from a detailed description of the preferred embodiments that follows.

BRIEF DESCRIPTION OF THE DRAWINGS

FIG. 1 is a side-sectional view of an adhesive filled blind rivet inserted into two overlapping parts to be joined. Also shown is the mandrel for forming the blind side head on the rivet and for extruding adhesive through holes in the rivet sleeve against the parts;

FIG. 2 is a side-sectional view of the blind rivet following formation of the blind rivet head and the mandrel-forced flow of adhesive to the joining region and between the rivet body and interior surfaces of the aligned holes of the parts to be joined;

FIGS. 3A–3C are side-sectional views of additional embodiments of the adhesive reservoir extended section of the sleeve of the blind rivet;

DESCRIPTION OF THE PREFERRED EMBODIMENTS

A first embodiment of the adhesive encapsulated blind rivet design of the present invention is shown in the enlarged sectional view of FIG. 1. Broken away portions of two sheet metal parts 10, 12 are assembled for placement of a rivet assembly 18. A rivet hole 14 has been formed in part 10 and a similar rivet hole 16 has been formed in part 12. Holes 14, 16 are then aligned for insertion of blind rivet 18. Although parts 10, 12 are held together for riveting, there remains a small gap 36, which is exaggerated in size in enlarged view FIG. 1, formed between faying surfaces 38, 40 of parts 10, 12, respectively. As further discussed in this specification, gap 36 provides a space for a film of adhesive to enter upon being extruded from rivet 18.

Blind rivet assembly 18 has a rivet head 22 and a tubular rivet body 20 that is inserted in aligned holes 14, 16. For purposes of illustration, part 10 and its upper surface 24 represents the accessible side of the assembly and rivet head 22 fits against surface 24 and covers hole 14. Tubular body 20 has a smaller diameter than rivet head 22 and extends from rivet head 22 through holes 14, 16, to below the blind side 32 of assembled parts 10, 12.

Blind rivet 18 includes a mandrel shaft 50 having a mandrel head 58 located at one end. Mandrel 50 is smaller in diameter than the internal diameter of tubular rivet body 20. In the assembly of rivet 18, mandrel 50 is inserted through the open end of body 20 and through a hole 60 in rivet head 22. Mandrel 50 extends through rivet head 22 a sufficient distance to be grasped by a riveting tool, not shown, for upsetting of the open end of tubular body 20, as will be described below. Mandrel head 58 engages the open end 26 of tubular rivet body 20. The diameter of mandrel head 58 is nearly the same as the outside diameter of rivet body 20 so that mandrel head 58 will slip through holes 14 and 16 when the rivet body 20 is inserted through them. When the rivet assembly 18 has been inserted as seen in FIG. 1, mandrel head 58 is on the blind side 32 of parts 10, 12. When mandrel head 58 is inserted to a position close against the open end 26 of rivet body 20 a closed space is defined within rivet body 20, rivet head 22 and mandrel head 58. In accordance with this invention that space is filled with an adhesive 34 so that the space is an adhesive reservoir.

The length of tubular rivet body 20 can be considered as having two portions or sections. The first and longest body portion is indicated by bracket 42. This portion of the rivet body 20 extends from rivet head 22 through the combined thicknesses of parts 10 and 12. However, in accordance with this invention, the rivet body 20 is extended beyond normal requirements for rivet head material to include a second body portion, indicated by bracket 44, for the purpose of holding more adhesive 34. Portion 42 of tubular body 20 contains one or more radially directed holes 62 along its length and around its circumference for the expulsion of some of the adhesive 34 as will be described.

The extended second body portion 44 extends substantially beyond blind surface 32 of assembled parts 10, 12 and comprises a number of weakened bands or zones 46. In this embodiment, the weakened bands 46 have a wave-like or corrugated shape with a number of peaks 52 separated by troughs 54. The corrugations are formed about the circumference of second body portion 44. During the setting of rivet assembly 18, peaks 52 fold against each other at troughs 54 to form one or more uniform folds 48 in the second body portion 44, as illustrated in FIG. 2, of the rivet body 20 material. This combination of metal folds 48 constitutes the rivet head pressing against blind surface 32 of part 12.

It is recognized that the number of folds illustrated in FIG. 2 may be greater than necessary for blind side rivet head formation and the representation of the folds is somewhat idealized in FIG. 2. But the purpose of the extended body portion 44 is to permit a larger amount of adhesive to be extruded from the first body portion 42 against adjacent surfaces of the riveted parts 10, 12.

The purpose of the weakened bands or zones 46 is to facilitate the symmetrical and uniform collapse of the elongated rivet body portion 44 in pre-determined, or controlled, folds of the metal during blind side setting of rivet 18. Preferably two or more uniform folds 48 are made in portion 44 of tubular body 20 when mandrel 50 is pulled so that mandrel head 58 upsets the end 26 of body 20 to form blind side rivet head as folds 48. Upsetting of section 44 of rivet body 20 also extrudes adhesive 34 through adhesive holes 62 in body 20. The adhesive is redistributed in space 36 between faying surfaces 38, 40 of assembled parts 10, 12 and between the outside surface of the tubular rivet body 20 and the surfaces of rivet holes 14 and 16. The extruded adhesive dries or cures to strengthen the mechanical bond between parts 10, 12 provided by the set rivet assembly 18.

To complete the setting of rivet 18, a rivet setting tool (not shown) is applied to the upper end of mandrel 50. It is preferred to prevent the extrusion of adhesive 34 through hole 60 in rivet head 22. Accordingly, a rivet setting pressure plate 68 enclosing an elastomeric seal 66 is placed over the end of mandrel 50 (See FIG. 1). The seal body 66 is brought to bear on the upper surface 64 of rivet head 22 especially in the region of the rivet head hole 60.

In upsetting elongated portion 44 of tubular body 20, the rivet tool bears against pressure plate 68 and pulls on mandrel 50. As mandrel 50 is pulled up mandrel head 58 collapses the end of body 20, as described, to form the blind side head of the now fully set blind rivet assembly 18. As the extended portion 44 of rivet body 20 is collapsed and folded, adhesive is extruded through holes 62 against the adjacent surfaces of the now riveted parts 10, 12. But little or no adhesive escapes through rivet head 22 or between body 20 and mandrel head 58. The rivet setting tool is removed as is pressure plate 68 and seal 66. The portion of the mandrel 50 above rivet head 22 may be broken off as seen in FIG. 2 to provide a finished riveted surface above part 10.

As stated the weakened bands or zones 46 in extended portion 44 of rivet body 26 greatly facilitate the forming of uniform folds 48 and avoid adhesive loss past mandrel head 58.

FIGS. 3A, 3B and 3C illustrate other embodiments of providing weakened zones 46 in the extended portion 44 of rivet body 20. As shown in FIG. 3A, extended section 44 has axially spaced, circumferential bands 46 of reduced material thickness formed on the outer side of the rivet body 20. Such weakened bands 46 may be formed by cutting or rolling thinned regions into extended portion 44 of tubular body 20. These thinned and weakened regions 46 provide folding bands for making a rivet head on the blind side of the assembled parts 10, 12.

In another embodiment the weakened bands may be formed alternately on the inside surface 29 of second body portion 44 as well as on the outside surface 27. As shown in FIG. 3B, the weakened zones are machined or rolled, semi-circular, circumferential grooves 56 and are formed as axially spaced bands in alternate outside and inside locations. This alternate arrangement of the weakened bands accommodates alternate inward and outward folding of the material in the second tubular body portion 44 as the blind side rivet head is formed and adhesive is extruded.

FIG. 3C illustrates a third embodiment of weakened bands in extended body portion 44. Axially spaced, circumferential bands of metallurgically softened or weakened metal 70 are formed by a suitable heat treatment or like softening process. These softened or weakened bands 70 are made for example, by laser heat treating, or the like. The softened regions may be formed as continuous circumferential bands or as a linear band of individual soft spots selected in a pre-determined manner. The weakened metal 70 can extend through the thickness of the second body portion 44 to provide metal folding lines that accommodate a symmetrical folded collapse of the tubular body during setting of the rivet assembly 18. In other words, softening of the rivet body completely through its thickness permits the material to fold in a natural progression as the mandrel head 58 is pulled against the end 26 of the rivet body 20.

When the adhesive is extruded from reservoir 34 during installation of rivet 18, adhesive flows through sleeve holes 62 to the region located between rivet body 20 and pre-formed holes 14, 16 and eventually to joining region 36, located between adjacent surfaces 38, 40 of parts 10, 12. A portion of adhesive does remain in reservoir 34 creating another seal inside the reservoir, which seals the rivet against leakage.

While the invention has been described in terms of certain preferred embodiments, it is apparent that other embodiments could readily be devised by one skilled in the art. This, the scope of this invention is not intended to be limited to the description but only to the extent to the following claims.

What is claimed is:

1. A rivet for use in joining an assembly of two or more material layers through a rivet hole extending through said layers, said layers having a thickness and said assembly having a first side that is accessible for the insertion of said rivet and a second side that is inaccessible for the setting of said rivet from that side, said rivet comprising:

a first rivet head larger than said rivet hole, a tubular rivet body of plastically deformable material attached at one end to said rivet head and having a second end for plastic deformation into a second rivet head, said tubular rivet body being shaped and sized to fit into and through said rivet hole, and an extrudable body of adhesive in said tubular rivet body;

said tubular rivet body having a length including a first portion starting at said rivet head with a first portion length to extend through said layers and to contain a first portion of said adhesive, and a second portion with a second portion length for containing a second portion of said adhesive, said first portion having axially spaced holes alone said first portion length for expulsion of adhesive from said tubular rivet body, and said second portion having weakened regions for plastically deforming said second portion of said tubular rivet body as a rivet head against said second side of said assembly and for extruding said second portion of adhesive into said first portion of said rivet body and expelling said first portion of said adhesive.

2. A rivet as recited in claim 1 further comprising a mandrel shaft terminating in a mandrel head, said mandrel head being positioned against the end of the second portion of said tubular rivet body for plastically deforming said second portion of said tubular rivet body as said second rivet head, said mandrel shaft extending within said tubular rivet body and through a hole in said first rivet head, said first portion of said adhesive being contained around said mandrel shaft.

3. A rivet as recited in claim 2 in which the second portion length of said tubular rivet body accommodates at least one quarter of the total of said first and second portions of adhesive.

4. A rivet as recited in claim 1 comprising one or more circumferential bands of weakened regions in said second portion of said tubular body and further comprising a mandrel shaft terminating in a mandrel head, said mandrel shaft extending within said tubular rivet body and through a hole in said first rivet head, said first portion of said adhesive being contained around said mandrel shaft, said mandrel head being positioned against the end of the second portion of said tubular rivet body for plastically deforming said second portion of said tubular rivet body into one or more folds of said deformable material as said second rivet head and for extruding said second portion of adhesive into said first portion of said rivet body and expelling said first portion of said adhesive.

5. A rivet recited in claim 4 which the second portion length of said tubular rivet body accommodates at least one quarter of the total of said first and second portions of adhesive.

6. A rivet as recited in claim 4 in which said weakened band is formed by a corrugation in said second portion.

7. A rivet as recited in claim 4 in which said weakened band is formed by thinned material in said second portion.

8. A rivet as recited in claim 4 in which said weakened band is formed by softened material in said second portion.

9. A rivet as recited in claim 1 in which the second portion length of said tubular rivet body accommodates at least one quarter of the total of said first and second portions of adhesive.

10. A rivet for use in joining an assembly of two or more material layers through a rivet hole extending through said layers, said layers having a thickness and said assembly having a first side that is accessible for the insertion of said rivet and a second side that is inaccessible for the setting of said rivet from that side, said rivet comprising:

a first rivet head larger than said rivet hole, a tubular rivet body of plastically deformable material attached at one end to said rivet head and having a second end for plastic deformation into a second rivet head, said tubular rivet body being shaped and sized to fit into and through said rivet hole, a mandrel shaft terminating in a mandrel head, said mandrel head being positioned against the end of the second portion of said tubular rivet body for plastically deforming said second portion of said tubular rivet body as said second rivet head, said mandrel shaft extending within said tubular rivet body and through a hole in said first rivet head, and a body of extrudable adhesive in said tubular rivet body around said mandrel shaft;

said tubular rivet body having a length including a first portion starting at said rivet head with a first portion length to extend through said layers and to contain a first portion of said adhesive, and a second portion with a second portion length for containing a second portion of said adhesive, said first portion having axially spaced holes, around its circumference and along said first portion length, for expulsion of adhesive from said tubular rivet body, and said second portion having weakened regions for plastic deformation of said second portion of said tubular rivet body as a rivet head against said second side of said assembly and for extrusion of said second portion of adhesive into said first portion of said rivet body and expelling said first portion of said adhesive from said tubular body through said holes in said first body portion.

11. A rivet as recited in claim 10 in which said weakened band is formed by a corrugation in said second portion.

12. A rivet as recited in claim 10 in which said weakened band is formed by thinned material in said second portion.

13. A rivet as recited in claim 10 in which said weakened band is formed by softened material in said second portion.

* * * * *